United States Patent
Chin et al.

[19]

[11] Patent Number: 6,076,127
[45] Date of Patent: Jun. 13, 2000

[54] CONFIGURATION OF A SINGLE POINT BUS ARBITRATION SCHEME USING ON-CHIP ARBITERS

[75] Inventors: Henry Chin, Wappingers Falls; George Totolos, Jr., Poughkeepsie, both of N.Y.

[73] Assignee: International Business Machines Corporation, Armonk, N.Y.

[21] Appl. No.: 08/744,812

[22] Filed: Nov. 6, 1996

[51] Int. Cl.[7] .......................... B41B 15/00; G06F 13/00; G06F 13/40; G06F 13/42
[52] U.S. Cl. .................. 710/113; 710/100; 710/126; 710/105
[58] Field of Search ...................... 395/293, 280, 395/285, 286, 289, 306, 309, 287, 500

[56] References Cited

U.S. PATENT DOCUMENTS

| | | | |
|---|---|---|---|
| 4,482,950 | 11/1984 | Dshkhunian et al. | 364/200 |
| 4,649,471 | 3/1987 | Briggs et al. . | |
| 4,730,268 | 3/1988 | Marin . | |
| 4,745,548 | 5/1988 | Blahut . | |
| 4,777,591 | 10/1988 | Chang et al. . | |
| 4,787,033 | 11/1988 | Bomba et al. . | |
| 5,034,881 | 7/1991 | Hoashi et al. | 364/200 |
| 5,079,737 | 1/1992 | Hackbarth . | |
| 5,148,545 | 9/1992 | Herbst et al. . | |
| 5,305,442 | 4/1994 | Pedersen et al. . | |
| 5,377,331 | 12/1994 | Drerup et al. | 395/325 |
| 5,388,223 | 2/1995 | Guthrie et al. . | |
| 5,392,436 | 2/1995 | Jansen et al. . | |
| 5,404,462 | 4/1995 | Darwyler et al. | 395/325 |
| 5,408,129 | 4/1995 | Farmwald et al. . | |
| 5,416,909 | 5/1995 | Long et al. | 395/275 |
| 5,694,581 | 12/1997 | Cheng | 395/500 |
| 5,724,583 | 3/1998 | Carmon et al. | 395/650 |
| 5,812,880 | 9/1998 | Goto et al. | 395/857 |
| 5,862,353 | 1/1999 | Revilla et al. | 395/287 |

OTHER PUBLICATIONS

"Common Arbiter Interface Device Wigh Arbitration Configuration For Centralized Common Bus Arbitration"by H. Chin, IBM Docket No. P0996069, Serial No. 08/744,813, Filed Nov. 6,1996.

*Primary Examiner*—Ayaz R. Sheikh
*Assistant Examiner*—Tim T. Vo
*Attorney, Agent, or Firm*—Marc A. Ehrlich

[57] ABSTRACT

A method and apparatus for configuring a single point arbitration scheme for a commonly accessed communication bus using bus master devices with arbitration control circuitry included therein. Bus master devices including arbitration control circuitry may be connected to an arbitration control bus over which signals for arbitrating control to the commonly accessed communications bus are provided. During a configuration mode of operation, the same connections to the arbitration control bus provide signals which are decoded at each bus master device to provide a configuration status which indicates whether other bus master devices requiring arbitration are connected to the arbitration control bus and whether the arbitration control circuitry included on the particular device will be enabled to perform the arbitration. Accordingly, single point arbitration of a commonly accessed bus is configured without adding an external arbiter circuit to the bus system or otherwise increasing the I/O requirements of the bus master devices.

50 Claims, 3 Drawing Sheets

CONFIGURATION OF A SINGLE POINT BUS ARBITRATION SCHEME USING ON-CHIP ARBITERS

CROSS REFERENCE TO RELATED APPLICATION

This application for Letters Patent is related, and cross reference may be had to the U.S. patent application entitled "as Ser. No. 08/744,813 Common Arbiter Interface Device With Arbitration Configuration For Common Bus Arbitration" by Henry Chin, which is filed concurrently herewith.

FIELD OF THE INVENTION

The present invention relates to the field of data bus arbitration, and particularly to single point bus arbitration systems designed using multiple bus master devices with built-in arbitration control circuitry wherein each bus master device may control a commonly accessed bus.

BACKGROUND OF THE INVENTION

In modern computer system design it is common for multiple devices to be coupled to a common communication bus. Moreover, it is also common for more than one of these devices to possess the capability to act as a bus master which controls the transfer of data, control and address signals between itself and another device over the common communication bus. In such computer systems it is therefore necessary to implement an arbitration scheme to determine the order in which these multiple bus master devices may control the common bus. The arbitration scheme is utilized during situations in which two or more of the bus master devices simultaneously seek to control the common bus.

Arbitration schemes are often implemented via a separate arbitration control circuit component which is coupled to each of the devices which can control the common bus. However, the use of a separate arbitration control component adds to the I/O requirements of the bus master devices as well as the wiring complexity of the system. Consequently, the external arbitration control component limits the number of devices that may be used in a given computer system. Furthermore, inter-device transactions with the separate arbitration control component are inherently slower than on-device transactions. Thus, it is advantageous to include the arbitration control circuitry on a bus master device.

In systems comprising multiple bus master devices it may be further desirable to utilize common circuitry for each of the bus master devices. The use of a single part number for the bus master devices may result in significant cost savings for the system. In a system comprising multiple bus master devices it may be advantageous to include bus arbitration control circuitry on each of the devices such that the bus master—arbitration control devices represent a single part number in the system design.

Accordingly, recent designs have incorporated arbitration control circuitry onto devices capable of controlling the common bus. For example, U.S. Pat. No. 4,745,548 to Blahut (issued May 17, 1988), teaches the inclusion of a separate self-contained arbitration request circuit and a separate arbitration resolution circuit as a part of each of the chips that require access to a common data bus.

In a system including multiple bus master devices having built-in arbitration control circuitry, a mechanism must be provided to perform arbitration between the multiple bus master devices with the included arbitration circuits. In certain systems, such as the aforementioned system disclosed in the patent to Blahut, as well as the system described in U.S. Pat. No. 4,482,950 to Dshkhunian et al. (issued Nov. 13, 1988) a distributed arbitration scheme is implemented wherein each of the on-chip arbitration circuits actively participates in determining which bus master will control the common bus.

In distributed arbitration schemes, each of the multiple bus master devices is typically assigned a priority which reflects the sequence in which each of the multiple bus master devices may control the bus. A bus master device having a high priority will take precedence over a bus master device having a low priority when each of the devices simultaneously requests control of the common bus. Priority may be determined by the position at which a particular bus master device attaches to the common bus. In the distributed arbitration scheme described in U.S. Pat. No. 5,408,129 to Farmwald et al. (issued Apr. 18, 1995), each device on the bus is assigned a unique device ID number. When a collision between bus master requests to control the common bus occurs, each bus master device seeking to control the bus drives a single BusData line during a single bus cycle corresponding to its assigned master ID number, and a fixed priority scheme is implemented to sequence the requests in a bus arbitration queue maintained by at least one device. Further bus master requests are disabled until the queue is cleared.

Distributed arbitration designs are not the optimum means for performing bus arbitration in all systems utilizing a commonly accessed bus. Typically the distributed arbitration design is inflexible and it is difficult to affect a modification in priority assignments. Moreover, priority assignments may lead to the "starvation" of a lower priority device. Consequently, such prioritization schemes mandate a prioritization of the operations to be performed by each of the bus masters, to ensure that low priority devices which control the bus less frequently than high priority devices are not responsible for performing the most important operations over the common data bus. Furthermore, in priority schemes such as the scheme disclosed in the patent to Farmwald et al., bus cycles are devoted to the resolution of conflicting bus master requests thereby reducing the bandwidth of the common data bus.

Accordingly, certain designs for systems implementing a commonly accessed bus dictate the implementation of a single point arbitration scheme incorporating multiple bus master devices including arbitration control circuitry. Systems including a commonly accessed bus in which the arbitration is performed by a single arbitration control circuit on one of the bus master devices including arbitration control circuitry are typically implemented by providing additional I/O on each of the bus master devices. The additional I/O serves to enable an arbitration control circuit on a single bus master device, while disabling each of the arbitration control circuits on the other bus master devices. However, such an implementation adds I/O to each of the bus master devices, and thus conflicts with the original motivation for combining the bus master devices with the arbitration control circuitry.

SUMMARY OF THE INVENTION

The foregoing problems and the shortcomings of the prior art are overcome and additional advantages are provided by the present invention in which an apparatus and method for configuring a single point bus arbitration scheme with bus master devices including arbitration control circuitry is taught.

Bus master devices including bus device logic circuitry for controlling a communication bus, may be coupled to a commonly accessed bus which may carry address signals, data signals and control signals. The bus master devices include arbitration control circuitry for resolving conflicting requests from multiple bus master devices for control of the common bus.

Each of the bus master devices including arbitration control circuitry may be interconnected via an arbitration control bus. By coupling to the arbitration control bus, the devices transmit and receive signals which permit an active arbitration circuit in one of the so-connected devices to arbitrate between conflicting requests to control the common bus.

In the present invention, the bus master devices additionally include an arbitration configuration circuit which enables the devices to decode signals received over the arbitration control bus to provide configuration status signals for each device. The configuration status signals indicate to each of the bus master devices whether there are other bus master devices connected to the arbitration control bus and whether the arbitration control circuitry included in each bus master device is to be activated to perform the arbitration of the common bus. The bus master devices receive the arbitration control bus signals which permit arbitration of the common bus as well as the arbitration control bus signals for generating the configuration status signals over the same connections to the arbitration control bus.

Accordingly, the configuration of a single point arbitration scheme for a commonly accessed communication bus is enabled without requiring additional I/O on the bus master devices or diminishing the bandwidth of the communication bus.

BRIEF DESCRIPTION OF THE DRAWINGS

The subject matter which is regarded as the invention is particularly pointed out and distinctly claimed at the conclusion of the specification. The foregoing and other features and advantages of the invention will be apparent from the following detailed description in conjunction with the accompanying drawings, in which:

FIG. 4 depicts an embodiment of a configuration state table implemented by decode logic within an exemplary arbitration configuration circuit;

DETAILED DESCRIPTION OF THE PREFERRED EMBODIMENTS OF THE INVENTION

In accordance with the principles of the invention, a method and apparatus for configuring a single point arbitration scheme for controlling a commonly accessed communication bus using bus master devices including arbitration control circuitry is disclosed.

To permit single point arbitration control of the common bus without requiring additional I/O or diminishing the bandwidth of the common bus, each of the bus master devices including the arbitration control circuitry includes means for coupling to an arbitration control bus to provide and receive arbitration control signals. The arbitration control circuitry included on a designated bus master device utilizes these signals to arbitrate control of the common bus among each of the bus master devices.

Each bus master device further includes arbitration configuration circuitry. The arbitration configuration circuitry utilizes arbitration control bus signals received via the same inputs that are used by the arbitration control circuit. During a configuration mode of operation, these signals are decoded by the arbitration configuration circuitry to determine for each of the devices, whether other such devices are coupled to the arbitration control bus necessitating arbitration to the common bus, and whether the arbitration control circuitry included in the particular device is to perform the arbitration of the commonly accessed bus.

Figure 1:
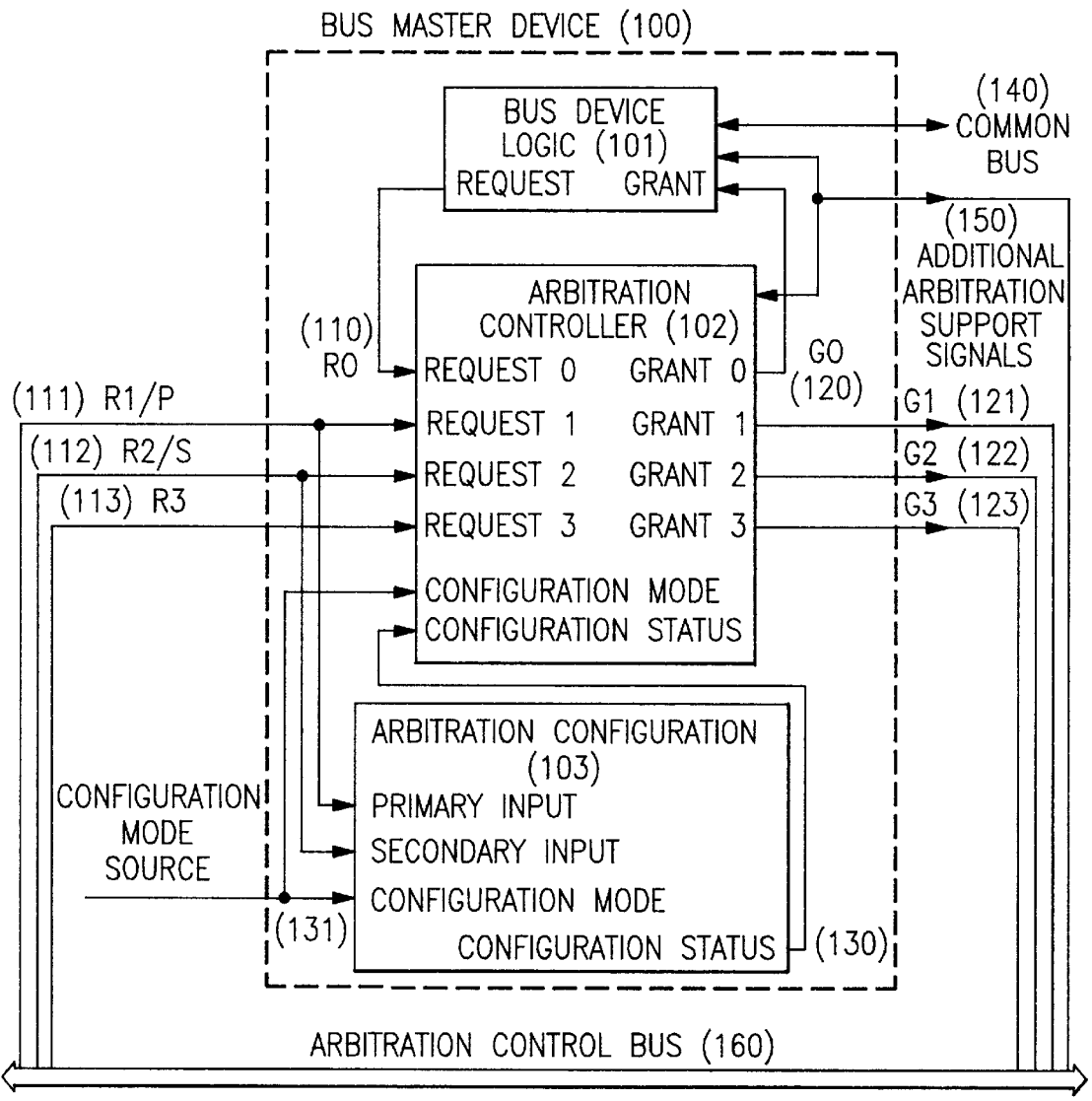
FIG. 1 depicts an exemplary bus master device including a bus device circuit, an arbitration control circuit, and an arbitration configuration circuit.

Turning now to our invention in greater detail, reference may be had to FIG. 1 which depicts an exemplary bus master device (100) generally designed in accordance with the principles of the present invention. In a preferred embodiment of the invention, the bus master device (100) is an integrated circuit component including circuitry on a semiconductor carrier incorporated into a component package. The bus master device circuitry may enable the device to function as any one of a variety components such as a processor, a direct memory access controller (DMA), a memory management unit (MMU), or any other analog or digital component which may transmit and receive signals over a common bus.

The bus master device (100) includes a bus device logic circuit (101) which enables the bus master device to control the transmission and receipt of signals over a common bus (140). The bus master device (100) additionally includes an arbitration control circuit (102) which is coupled to the bus device logic circuit (101) via request line R0 (110) and grant line G0 (120). The arbitration control circuit can be instructed to perform arbitration for control of the common bus (140) via receipt of configuration status signals (130) from an arbitration configuration circuit (103), over configuration status lines (130). When the arbitration control circuit (102) is so instructed, it arbitrates control of the common bus among conflicting requests from multiple devices which include bus master circuits. The arbitration control circuit (102) additionally includes a configuration mode input (131) for determining when the bus master device is operating in a configuration mode, during which the operational state of the device is ascertained. A detailed explanation of the configuration mode operation of the bus master device will be subsequently provided.

The arbitration control circuit (102) controls access to the common bus via the communication of arbitration control signals and additional arbitration support signals (150) (such as a bus busy signal), between multiple bus master devices coupled to the common bus. When an arbitration control circuit (102) has been activated to arbitrate control of the common bus (140), it does so by receiving request signals from the other bus master devices and transmitting grant response signals back to these devices over a commonly accessed arbitration control bus (160). Request signals are received via the exemplary request signal connections R1/P (111), R2/S (112), R3 (113) to the arbitration control bus and grant responses are transmitted via the exemplary grant signal connections G1 (121), G2 (122) and G3 (123) to the arbitration control bus. Additionally, the arbitration control circuit (102) receives requests for control of the common bus (140) and issues grant responses to the bus device logic (101) on its own bus master device (100) via the Request 0 (110) and Grant 0 (120) lines respectively.

The device illustrated in FIG. 1 depicts a bus master device (100) with an arbitration control circuit (102) having three external request inputs and three external grant outputs, however it will be understood by those skilled in the relevant art that any number of arbitration control lines comprising the arbitration control bus (160) may be coupled to the arbitration control circuit. The number of such arbitration control lines depends upon the number of bus master devices coupled to the common bus (140) which may require arbitration. In a preferred embodiment of the invention, these connections may be pins extending from the bus master device package thereby enabling connections to a commonly accessed arbitration control bus (160).

Figure 3:
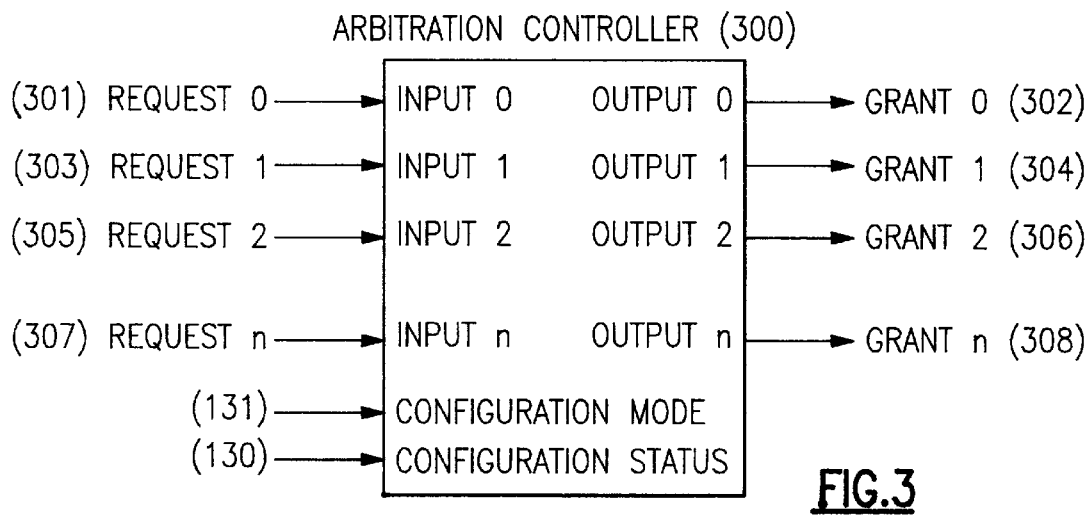
FIG. 3 depicts a block diagram of an exemplary arbitration control circuit.

A typical arbitration control circuit is shown in greater detail in FIG. 3. In a preferred embodiment of the invention, arbitration control is based upon a request-grant protocol. The arbitration control circuitry (300) includes request-grant pairs illustrated as Request 0 (301) pairing with Grant 0 (302), Request 1 (303) pairing with Grant 1 (304) and so on up to Request n (307) pairing with Grant n (308), wherein the request lines represent inputs to the arbitration control circuit, receiving signals from the arbitration control bus (160), and the grant lines represent outputs therefrom, driving signals on to the arbitration control bus. The request and grant pairs illustrated in FIG. 3 relate to the request and grant lines in FIG. 1 as follows: input R1/P (111) pairs with output G1 (121), input R2/S (112) pairs with output G2 (122), and input R3 (113) pairs with output G3 (123).

The arbitration control circuit (102) may be enabled to perform arbitration of the common bus (140) via receipt of the configuration status signal (130). An enabled arbitration circuit included in bus master device (100) would arbitrate access to the common bus (140) as follows: A bus master device requiring arbitration onto the common bus would be coupled to the bus master device containing enabled arbitration control circuitry (102) via one of the request-grant pairs of I/O, for example R1/P (111) and G1 (121). When the device requires control of the common bus, it will activate a request signal to be received over R1/P (111) at the device including the enabled arbitration control circuit (102). The requesting device will then wait for notification of its assignment to the common bus via the grant signal from output G1 (121) of the device including the enabled arbitration control circuit (102). Each bus master device coupled to the common bus (140) is coupled to the bus master device containing the enabled arbitration control circuit (100) via one of the aforementioned request-grant pairs.

Figure 2:
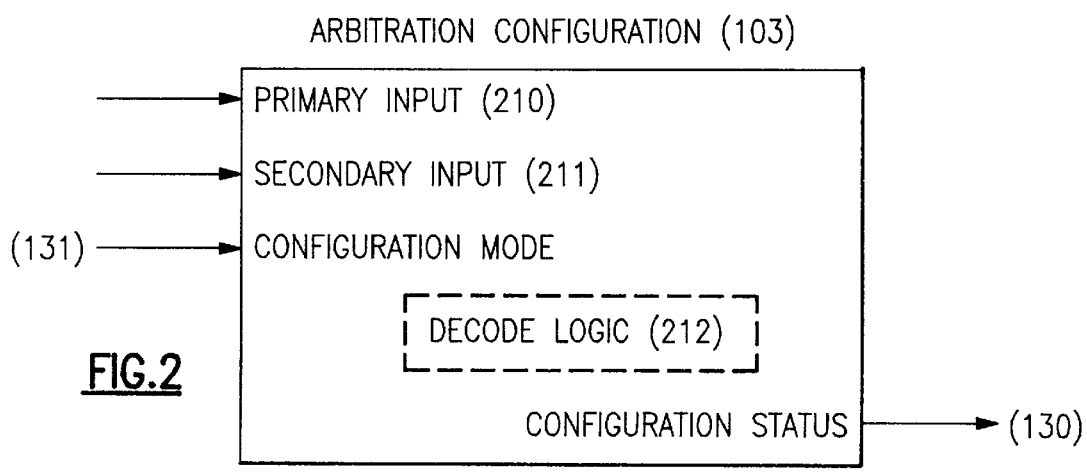
FIG. 2 illustrates a block diagram of an exemplary arbitration configuration circuit utilized in the bus master device.

The bus master device (100) further includes arbitration configuration circuitry (103) which is shown in greater detail in FIG. 2. The arbitration configuration circuitry (103) includes inputs designated as a primary input (210), a secondary input (211) and a configuration mode input (131), and a number of outputs designated as configuration status outputs designated by the single line (130). The arbitration configuration circuit (103) includes decode logic (212) for decoding the primary input (210) and the secondary input (211) when activated by a configuration mode signal at the configuration mode input (131). The decode logic generates configuration status signals (130) at configuration status outputs (130) which are received by the arbitration control circuit (102). The configuration status signals determine whether any other devices requiring arbitration to the common bus (140) are coupled to the arbitration control bus (160), and if so, whether the arbitration control circuit (102) on the particular device is to be activated to perform the arbitration of the common bus (140).

The primary input (210) of the arbitration configuration circuit (103) is coupled to a request line from the arbitration control bus connecting to an input (for example R1/P (111)) of the arbitration control circuit (102). Likewise, the secondary input (211) is coupled to a request line from the arbitration control bus connecting to an input (for example R2/S (112)) of the arbitration control circuit (102). Additionally, the configuration mode input (131) is a shared input (131) coupling to both the arbitration control circuit (102) and the arbitration configuration circuit (103) from a pre-existing input on the bus master device (100). Thus, since the arbitration configuration circuit (103) shares inputs from the arbitration control bus (160) with the arbitration control circuit (102) and other inputs, and does not produce signals that are to be transmitted external to the device it is not necessary to add I/O to the bus master device (100) to operate the bus master configuration circuit (103).

The signal for the configuration mode input (131) is generated external to the device and is provided to the bus master device over a pre-existing input. In a preferred embodiment of the invention, a reset input for a processor serving as an exemplary bus master device (100) is utilized. In such an embodiment, the configuration mode may be activated when the reset signal toggles to an active state. The use of the reset line is intended as an exemplary implementation, however those skilled in the art will recognize that other pre-existing bus master inputs, or a combination thereof, such as one of the additional arbitration support signal inputs (150) may be utilized in a like manner.

The operation of the exemplary bus master device (100) is dependent upon the state of the configuration mode signal (131). When the configuration mode signal (131) toggles to an active state, indicating that the bus master device is in a configuration mode of operation, the arbitration control circuit (102) responds by driving active grant signals on the output lines G1 (121), G2 (122) and G3 (123) to the arbitration control bus (160). The request inputs of arbitration control circuit (102) receive signals from the arbitration control bus (160) from grant outputs on other such devices coupled to the bus master device. The arbitration configuration circuit (103), as previously noted, shares two of these request inputs designated as the primary input (210) and the secondary input (211) and receives the active configuration mode signal via the configuration mode line (131).

Upon receiving the active configuration mode signal, the arbitration configuration circuit (103) initiates the aforementioned decoding of the primary and secondary inputs via decode logic (212) to provide the configuration status signals (130) to the arbitration control circuit (102) thereby determining the operational state of the bus master device in the arbitration scheme.

When the configuration mode signal over the configuration mode line (131) subsequently toggles to an inactive state, the arbitration control (102) operation of the bus master device (100) is dependent upon the configuration status signals (130) that were provided to the arbitration control circuit (102) by the arbitration configuration circuit (103) during the configuration mode of operation. If the arbitration control circuit (102) had received configuration status signals (130) indicating that multiple devices are coupled to the arbitration control bus requiring arbitration, and that the arbitration control circuit (102) is to be enabled to perform the arbitration, the device subsequently functions, as previously noted, by receiving requests from other bus master devices over the request inputs R1/P (111), R2/S (112), and R3 (113). The grant outputs in response to these received requests are generated over G1 (121), G2 (122) and G3 (123) respectively. Additionally, the arbitration control circuit (102) receives requests for control of the common bus (140) and issues grant responses to the bus device logic (101) on its own bus master device (100) via the Request 0 (110) and Grant 0 (120) lines respectively.

Alternatively, if the arbitration control circuit (102) had received configuration status signals (130) indicating that multiple devices are coupled to the arbitration control bus (160) requiring arbitration, but that the arbitration control circuit (102) is not to perform the arbitration, the arbitration control circuit (102) is configured to function in the arbitration mode of operation, such that request signals received on input lines R1/P (111) and R3 (113) are ignored. The arbitration control circuit (102) in this configuration, functions as an I/O path for the bus device logic (101) during arbitration operation, permitting the bus device logic (101) to place requests on the arbitration control bus (160), and to receive grant responses therefrom. The receiver for request input R2/S (112) receives the grant output from an active arbitration circuit external to the bus master device (100) (i.e. from an active arbitration circuit on another bus master device) and internally communicates the grant signal to bus device logic (101) via Grant 0 (120). Similarly, the internal request (110) from bus device logic (101) is output from the bus master device via the output driver associated with G1 (121).

Finally, if the arbitration control circuit (102) had received configuration status signals (130) indicating that no other bus master devices are coupled to the arbitration control bus, the bus device logic (101) is instructed to control the common bus (140) without reference to signals from the arbitration control bus (160) and no arbitration control cycles are required for the operation of the bus master device (100). Furthermore, the arbitration control circuit (102) is instructed not to transmit or receive signals over the arbitration control bus (160).

This single bus master device operation may be accomplished via a variety of different implementations. In a preferred embodiment of the invention, the configuration status signals (130) connecting to the arbitration control circuit (102) instruct the arbitration control circuit to maintain an active signal from the G0 (120) output received by the bus device logic (101). In this manner, the bus device logic is "parked" on the common bus (140) and retains continuous control thereof. In another embodiment, one of the configuration status signals (130) which indicates that no other bus master devices are coupled to the arbitration control bus (160), may be directly coupled to the bus device logic (101) to enable its continuous control of the common bus (140) without reference to the arbitration control circuit (102).

The state table illustrated in FIG. 4 represents an exemplary decode operation that may be performed by the arbitration configuration circuit (103) during the configuration mode operation of the bus master device (100). The arbitration configuration circuit (103) may include any of a variety of decode circuitry (212) to implement this function. Such decode circuits as may be implemented in decode logic (212) are well known to those skilled in the art, and accordingly it is not necessary to elaborate upon a specific implementation of the logic to permit an understanding of the invention. In the exemplary state table, the active or inactive status of the primary input (210) and the secondary input (211) are utilized to decode an arbitration operation state for the particular bus master device (100).

The decode logic (212) generates configuration status signals (130), which inform the bus master device (100) whether other bus master devices requiring arbitration are connected to the arbitration control bus (160) and which determine whether the arbitration control circuit (102) on the device will perform the arbitration of the common bus (140). Accordingly, the arbitration mode operation of the bus device logic (101) and the arbitration control circuit (102) are precipitated upon the state of the configuration status signals (130).

In the exemplary state table (400) representing an embodiment of the decode logic (212) for the arbitration configuration circuit (103), an active signal received on the primary input (210) while the configuration mode signal (131) is active, produces configuration status signals (130) indicating that multiple bus master devices are coupled to the arbitration control bus (160) requiring arbitration to the common bus (140), and that the arbitration control circuit (102) on the bus master device (100) is to be enabled to perform the arbitration control. An inactive signal on the primary input (210) accompanied by an active signal on the secondary input (211), and an active configuration mode signal (131), produces configuration status signals (130) indicating that multiple bus master devices are coupled to the arbitration control bus (160) requiring arbitration to the common bus (140), but that the arbitration control circuit (102) in the bus master device (100) is not to be enabled to perform the arbitration control. During the arbitration operation mode, this arbitration control circuit (102) will serve as I/O through which the bus device logic (101) will drive requests (G1) and receive grant responses (R2/S) over the arbitration control bus (160). Finally, an inactive signal on both the primary input (210) and the secondary input (211), during the configuration mode of operation results in configuration status signals (130) indicating that no other bus master devices are coupled to the arbitration control bus (160), and consequently that no arbitration control is required for control of the common bus (140). Accordingly, the arbitration control circuit (102) is not enabled and does not transmit or receive signals over the arbitration control bus, and the bus device logic (101) will continuously control the common bus (140) without reference to arbitration control cycles.

Figure 5:
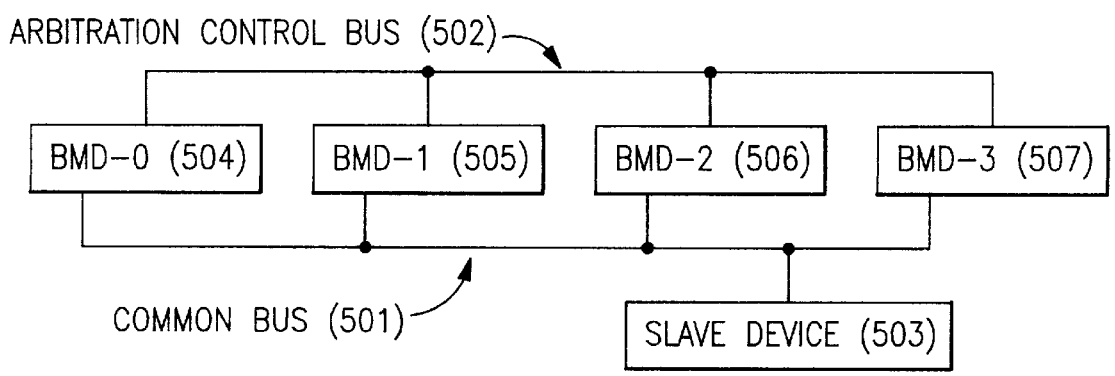
FIG. 5 illustrates a schematic overview of the interconnections among a plurality of exemplary bus master devices over an arbitration control bus and the connections for the exemplary bus master devices and a slave device to the common bus.

Referring now to FIG. 5 a block diagram for a bus system (500) implemented utilizing a plurality of bus master devices (100) (denoted BMD—0 through BMD—3, numbered elements 504 through 507 respectively) as well as slave device (503) is illustrated. Each of the bus master devices is coupled to the common bus (501), which in a preferred embodiment permits address signal, control signal and data signal communication between the devices. The slave device (503) is also connected to the common bus. A typical slave device may be, for example, a read only memory (ROM), or any other device which may send or receive data over the common bus, but which does not control communication over the common bus. Additionally, each of the bus master devices is coupled to the arbitration control bus (502) for the transmission and receipt of the request, grant and control signals required for arbitration of the common bus (501).

Figure 6:
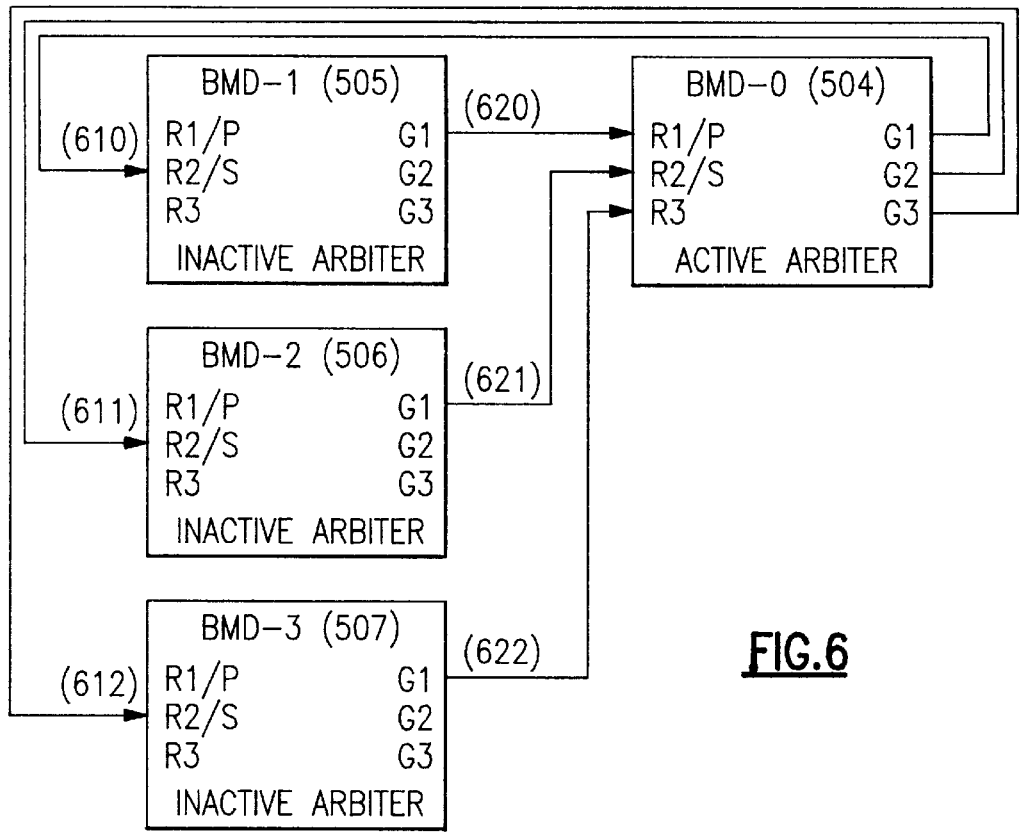
FIG. 6 depicts arbitration control bus connections for an exemplary system comprising a plurality of bus master devices.

Turning now to FIG. 6, the connections of the four exemplary bus master devices (BMD—0 through BMD—3) to the arbitration control bus (502) are depicted in greater detail. In the illustrated system BMD—0 (504) is configured to have its arbitration control circuit (102) enabled to arbitrate control of the common bus among bus master devices BMD—0 through BMD—3. The other bus master devices (BMD—1 (505), BMD—2 (506), and BMD—3 (507)) are each configured such that their respective arbitration control circuits (102) do not perform the arbitration. The arbitration control circuit (102) on each of these devices will serve as I/O to the arbitration control bus as previously described. During the arbitration mode of operation, these devices communicate with request-grant pairs on BMD—0 (504).

In order to properly configure each bus master device illustrated in FIG. 6, it is necessary to design the request inputs (111, 112 and 113) on each bus master device to register an inactive signal during the configuration mode of operation, if they are left unconnected. This input design may be accomplished in a variety of ways, including direct connections to an inactive state, or by connection to an inactive level through a resistor. In a preferred embodiment, the R1/P (111), R2/S (112), and R3 (113) inputs for a bus master device (100) are receivers with built-in resistors coupled to the required inactive level.

When the configuration mode signal (131) is activated, the arbitration control circuits (102) on each bus master device drive grant outputs G1 (121), G2 (122), and G3 (123) active. Concurrently, the arbitration configuration circuits (103) on each of the bus master devices begins receiving and decoding (212) the primary input (210) and the secondary input (211).

At each of the devices BMD—1 (505), BMD—2 (506) and BMD—3 (507), the primary inputs (210) (i.e. R1/P) are unconnected, and thus are registered as inactive. The secondary inputs (211) (i.e. R2/P) are driven active via the respective grant outputs G1 (121), G2 (122) and G3 (123) of BMD—0 (504). On each of these devices the decode logic (212) in the arbitration configuration circuit (103) implements state table (400), and generates configuration status signals (130) which instruct the arbitration control circuit (102) on each device that other bus master devices are coupled to the arbitration control bus necessitating arbitration of the common bus (140). Thus, the bus device logic (101) will utilize arbitration cycles in acquiring access to the common bus (104). Additionally, the configuration status signals (130) instruct the arbitration control circuit (102) on each bus master device (100) to provide I/O for the bus device logic (101) to transmit requests and receive grant responses over the arbitration control bus (160). Accordingly, arbitration control of the common bus is not enabled for the arbitration control circuits (102) on these devices.

During the aforementioned configuration mode of operation, BMD—0 (504), receives an active signal at R1/P (111) from the G1 (121) output of BMD—1 (505), and an active signal at R2/S (112) from the G1 (121) output of BMD—2 (506), and an active signal at R3 (113) from the G1 (121) output of BMD—3 (507). Thus, the arbitration configuration circuit (103) on BMD—0 (504) receives active signals at the primary input (210) (i.e. R1/P) and at the secondary input (211) (i.e. R2/S). The decode logic (212) on BMD—0 (504) implements state table (400) to generate configuration status signals (130) which inform the bus arbitration control circuit (102) that other bus master devices are coupled to the arbitration control bus, and which enable arbitration for control of the common bus (140) to be performed by the arbitration control circuit (102).

It will be apparent from the foregoing, that in a system wherein a single bus master device controls the common bus the bus master device is not coupled to an arbitration control bus (160) because there are no other bus master devices with which to exchange arbitration signals. Accordingly, the single bus master device would have its R1/P (111) and R2/S inputs unconnected, and would register inactive signals at the primary (210) and secondary (211) inputs of its arbitration configuration circuit (103) during its configuration mode of operation. The decode logic (212) implementing state table (400) for such a bus master device (100) would produce configuration status signals (130) indicating to the bus master device (100) that no other bus master devices are coupled to the arbitration control bus (160), and consequently, that the arbitration control circuit (102) is not to be enabled for arbitration control nor transmit or receive signals over the arbitration control bus. In response to these configuration status signals (130) the bus master device will operate via the bus device logic (101) connections to the common bus and will forego any communication over the arbitration control bus (160) using the arbitration control circuit (102).

Referring again to FIG. 6, when the configuration mode signal (131) subsequently toggles to an inactive state, the bus master devices participate in an arbitration operation mode in accordance with the configuration status signals (130) produced during the configuration mode. For example, requests received from BMD—1 (505) by BMD—0 (504) at R1/P (111) over line (620) elicit grant responses from the activated arbitration control circuit (102) on BMD—0 (504) driven by G1 (121) over line (610) to the R2/S (112) input on BMD—1 (505). Similarly, requests from BMD—2 (506) received at the R2/S (112) input of BMD—0 (504) over line (621) are responded to by G2 (122) of the BMD—0 (504) device over line (611) to the R2/S (112) input on BMD—2 (506). Finally, requests from BMD—3 (507) received at the R3 (113) input of BMD—0 (504) over line (622) produce a grant response at the G3 (123) output of the BMD—0 (504) device over line (612) to the R2/S (112) input on BMD—3 (507).

Each bus master device (100) including an inactive arbitration control circuit (102) communicates to the bus master device with the activated arbitration circuit (102) by sending requests (110) from the bus device logic (101) on to the arbitration control bus over a G1 (121) output, and by receiving grant responses from the bus master device with the activated arbitration control circuit (102) over line (120) from request input R2/S (112). Each of these bus master devices is coupled to a request-grant I/O pair on the bus master device including the enabled arbitration control circuit. The bus master device (504) including the enabled arbitration control circuit (102) performs the arbitration of the common bus (140) by receiving requests from the other bus master devices at the request inputs (111, 112, and 113) (as well as internally from its own bus device logic (101) over R0 (110)) and responding to the received requests over the paired grant outputs (121, 122 and 123 respectively) (as well as responding internally to its own bus device logic (101) over G0 (120)). It will be understood that additional bus master devices may be included in the exemplary bus master system illustrated in FIG. 6 by adding additional request-grant I/O pairs to the device containing the enabled arbitration control circuit (102) (i.e. BMD—0), and connecting the additional devices to the additional I/O pairs.

Figure 7:
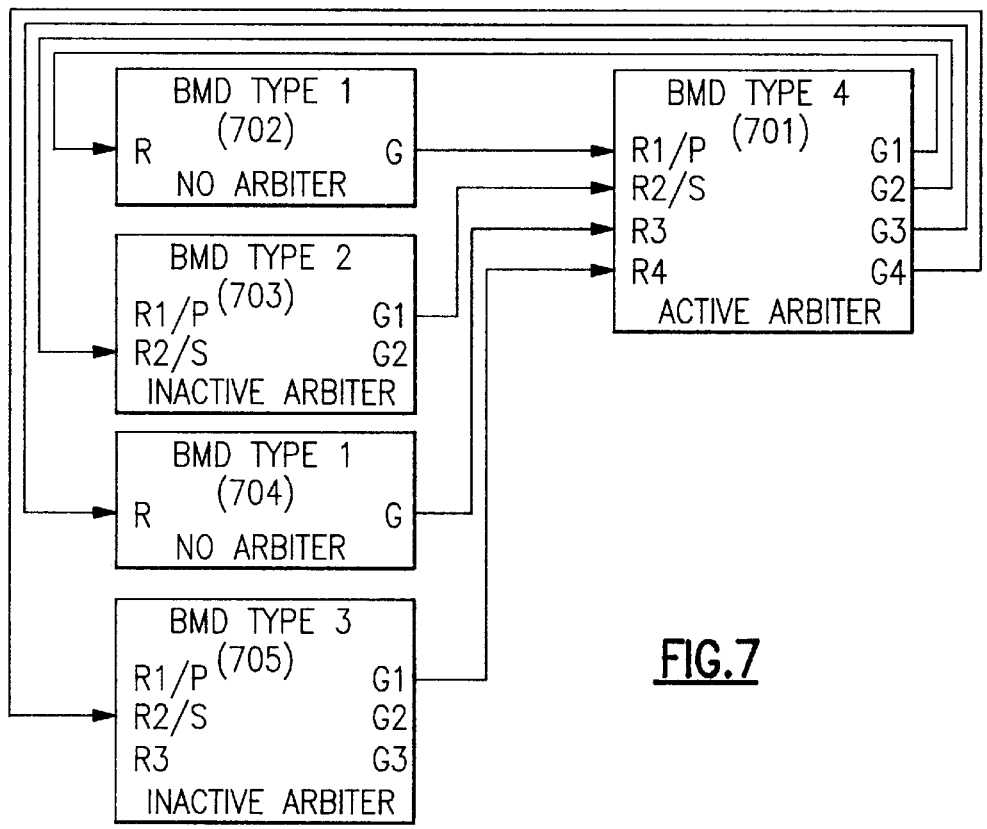
FIG. 7 depicts arbitration control bus connections for an exemplary heterogeneous system comprising bus master devices including various types of arbitration control circuits and bus master devices without arbitration control circuits.

As an alternative to the embodiment of the invention illustrated in FIG. 6, FIG. 7 illustrates a system including different types of bus master devices coupled to the arbitration control bus (160). The bus master devices designated type 1 (702, 704) contain no arbitration circuitry, and are thus not similar to the exemplary device depicted in FIG. 1. In these devices the bus device logic (101) would include the request and grant connections to the arbitration control bus (160) as well as connections to the common bus (140). In a first embodiment, these devices may not participate in the configuration of the arbitration scheme. In an alternative embodiment, type 1 devices with no arbitration control circuitry may be configured to drive their grant outputs high during the configuration mode and consequently, would participate in the configuration of the arbitration scheme.

The type 2 device (703) includes arbitration circuitry, and can supply arbitration for up to two external bus master devices via the two request-grant I/O pairs. The type 3 device (705) includes arbitration circuitry, and can supply arbitration for up to three external bus master devices via the three request-grant I/O pairs. Similarly, the type 4 device (701) includes arbitration circuitry which can arbitrate up to four external bus master devices.

In the illustrated system, the type 4 device (701) is configured so as to activate its arbitration control circuit (102). When a configuration mode signal (131) is activated, each device drives its grant outputs active. The arbitration configuration circuit (103) on the type 4 device (701) will receive active signals at its primary (210) and secondary (211) inputs which correspond to R1/P (111) and R2/S (112) respectively. Accordingly, the decode logic (212) for the type 4 device (701) will generate arbitration status signals (130) which will inform the device that other bus master devices are coupled to the arbitration control bus and enable the arbitration control circuit (102) therein. The type 2 device (703) and the type 3 device (705) will both register inactive signals over their unconnected R1/P inputs (111) corresponding to the primary inputs (210) of their arbitration configuration circuits (103) and active signals over their R2/S inputs (112) corresponding to the secondary inputs (211) thereof. Accordingly, the decode logic (212) for each of these devices will generate arbitration status signals (130) which will inform these devices that other bus master devices are coupled to the arbitration control bus, and that the arbitration control circuits (102) included therein are not to be enabled to perform the arbitration.

Once configured in this manner, the arbitration operation of the system illustrated in FIG. 7 proceeds in a manner similar to that previously described for FIG. 6. Thus, a bus system comprising different types of bus master devices may be operated in a manner similar to that previously described for operating a system including identical bus master devices. Accordingly, the present invention enables the arbitration configuration of a heterogeneous bus system including a variety of bus master devices.

Though preferred embodiments have been depicted and described in detail herein, it will be apparent to those skilled in the relevant art, both now and in the future, that various modifications, additions, improvements and enhancements may be made without departing from the spirit of the invention, and these are therefore considered to be within the scope of the invention as defined in the following claims.

For example, the exemplary bus master device has been described as including bus device logic, arbitration control circuitry and arbitration configuration circuitry. These circuits were described as separate entities so as to clearly describe the function associated with each circuit. However, it is contemplated that the design of such a bus master device may be implemented via any combination of circuitry which may achieve the results referred to herein.

The following claims should be construed to maintain the proper protection for the invention first disclosed.

What is claimed is:

1. A packaged semiconductor chip for configuring the arbitration of a common bus capable of being controlled by a bus master component, wherein semiconductor chip is capable of being directly coupled to said a bus master component capable of controlling the bus is coupled to the common bus and to an arbitration control bus, and wherein other bus master components may be coupled to said arbitration control bus, said packaged semiconductor chip comprising:

a bus master logic unit for controlling the communication of signals over said common bus, said packaged semiconductor chip including means for coupling said bus master logic unit to said common bus;

an arbitration control logic unit coupled to said bus master logic unit for providing single point arbitration control of said common bus among at least one of said bus master components and said bus master logic unit coupled to said common bus, said packaged semiconductor chip including means for coupling said arbitration control logic unit to said arbitration control bus for receiving and transmitting arbitration control signals and for transmitting arbitration configuration signals thereover; and an arbitration configuration logic unit coupled to said arbitration control logic unit for determining whether to enable said arbitration control logic unit to provide single point arbitration control of said common bus, said packaged semiconductor chip including means for coupling said arbitration configuration logic unit to said arbitration control bus for receiving arbitration configuration signals thereover;

wherein said arbitration configuration logic unit is arranged so as not to require separate dedicated input lines on the packaged semiconductor chip.

2. A packaged semiconductor chip according to claim 1 wherein said arbitration configuration logic unit decodes said received arbitration configuration signals to determine whether at least one of said bus master components are coupled to said arbitration control bus and to determine whether to enable said arbitration control logic unit to perform single point arbitration control of said common bus.

3. A packaged semiconductor chip according to claim 2 further including means for determining whether said packaged semiconductor chip is to operate in a configuration mode or in an arbitration mode.

4. A packaged semiconductor chip according to claim 3 wherein said arbitration control logic unit receives the operating mode determination from said means for determining whether said packaged semiconductor chip is to operate in said configuration mode or in said arbitration mode.

5. A packaged semiconductor chip according to claim 3 wherein said arbitration configuration logic unit receives the operating mode determination from said means for determining whether said packaged semiconductor chip is to operate in said configuration mode or said arbitration mode.

6. A packaged semiconductor chip according to claim 4 wherein if said arbitration control logic unit receives said determination that said packaged semiconductor chip is to operate in said configuration mode, said arbitration control logic unit will transmit active arbitration configuration signals onto said arbitration control bus.

7. A packaged semiconductor chip according to claim 4 wherein if said arbitration control logic unit receives said determination that said packaged semiconductor chip is to operate in said arbitration mode and if said arbitration configuration logic unit determines that at least one of said bus master components are coupled to said arbitration control bus, said arbitration control logic unit transmits and receives said arbitration control signals over said arbitration control bus.

8. A packaged semiconductor chip according to claim 4 wherein if said arbitration control logic unit receives said determination that said packaged semiconductor chip is to operate in said arbitration mode and if said arbitration configuration logic unit determines that none of said bus master components are coupled to said arbitration control bus, said arbitration control logic unit does not transmit and receive said arbitration control signals over said arbitration control bus.

9. A packaged semiconductor chip according to claim 4 wherein if said arbitration control logic unit receives said determination that said packaged semiconductor chip is to operate in said arbitration mode and if said arbitration configuration logic unit determines that none of said bus master components are coupled to said arbitration control bus, said bus master logic unit is enabled to control said common bus without participating in arbitration of said common bus.

10. A packaged semiconductor chip according to claim 4 wherein said means for coupling said arbitration control logic unit to said arbitration control bus include arbitration control bus request inputs and arbitration control bus grant outputs, said arbitration control bus request inputs and said arbitration control bus grant outputs affixed to said packaged semiconductor chip and capable of forming a conductive path from said arbitration control bus to said arbitration control logic unit.

11. A packaged semiconductor chip according to claim 5 wherein if said arbitration configuration logic unit receives said determination that said packaged semiconductor chip is to operate in said configuration mode, said arbitration configuration logic unit decodes said arbitration configuration signals received from said arbitration control bus to determine whether at least one of said master components are coupled to said arbitration control bus, and to determine whether to enable single point arbitration control of said common bus by said arbitration control logic unit.

12. A packaged semiconductor chip according to claim 7 wherein if said arbitration control logic unit receives said determination that said packaged semiconductor chip is to operate in said arbitration mode and if said arbitration configuration logic unit determines that at least one of said bus master components are coupled to said arbitration control bus, said bus master logic unit may control said common bus by participating in arbitration of said common bus.

13. A packaged semiconductor chip according to claim 10 wherein said means for coupling said arbitration configuration logic unit to said arbitration control bus include a plurality of said arbitration control bus request inputs, said arbitration configuration logic unit sharing said plurality of arbitration control bus request inputs with said arbitration control logic unit.

14. A packaged semiconductor chip according to claim 12 wherein if said arbitration configuration logic unit further determines that said arbitration control logic unit should be enabled to provide single point arbitration control of said common bus, said arbitration control logic unit receives request signals from said bus master logic unit on said packaged semiconductor chip and from said at least one bus master components coupled to said arbitration control bus, and transmits grant response signals to said bus master logic unit on said packaged semiconductor chip and to said at least one bus master components coupled to said arbitration control bus.

15. A packaged semiconductor chip according to claim 12 wherein if said arbitration configuration logic unit further determines that said arbitration control logic unit should not be enabled to provide single point arbitration control of said common bus, said arbitration control logic unit receives grant response signals from at least one of said bus master components coupled to said arbitration control bus, and transmits request signals to said at least one of said bus master components coupled to said arbitration control bus.

16. A packaged semiconductor chip according to claim 13 wherein a first input from said plurality of shared arbitration control bus request inputs is a primary input and a second input from said plurality of shared arbitration control bus request inputs is a secondary input, said arbitration configuration signals being received by said arbitration configuration logic unit via said primary and secondary inputs.

17. A packaged semiconductor chip according to claim 14 wherein if said bus master logic unit seeks to control said common bus, said bus master logic unit sends said request signals to said arbitration control logic unit, and wherein prior to assuming control of said common bus, said bus master logic unit must receive said grant response signals from said arbitration control logic unit.

18. A packaged semiconductor chip according to claim 15 wherein if said bus master logic unit seeks to control said common bus, said bus master logic unit sends a request signal to said arbitration control logic unit for transmission over said arbitration control bus, and wherein prior to assuming control of said common bus said bus master logic unit must receive said grant response signal from said arbitration control bus via said arbitration control logic unit.

19. A packaged semiconductor chip according to claim 16 wherein said primary and secondary inputs are configured to register an inactive state if they are not coupled to said arbitration control bus.

20. A packaged semiconductor chip according to claim 16 wherein said arbitration configuration logic unit receives said determination from said means for determining whether said packaged semiconductor chip is to operate in said configuration mode or said arbitration mode.

21. A packaged semiconductor chip according to claim 20 wherein if said arbitration configuration logic unit receives said determination that said packaged semiconductor chip is to operate in said configuration mode, said arbitration configuration logic unit decodes said arbitration configuration signals received at said primary and secondary inputs to determine whether at least one of said bus master components are coupled to said arbitration control bus and to determine whether to enable said arbitration control logic unit to provide single point arbitration control of said common bus.

22. A packaged semiconductor chip according to claim 21 wherein if said arbitration configuration logic unit receives an active arbitration configuration signal via said primary input, said arbitration configuration logic unit decodes the active arbitration configuration signal to determine that at least one of said bus master components are coupled to said arbitration control bus and to enable said arbitration control logic unit to provide single point arbitration control of said common bus.

23. A packaged semiconductor chip according to claim 21 wherein if said arbitration configuration logic unit receives an inactive arbitration configuration signal via said primary input and an active arbitration configuration signal via said secondary input, said arbitration configuration logic unit decodes the received signals to determine that at least one of said bus master components are coupled to said arbitration control bus and to determine not to enable said arbitration control logic unit to provide single point arbitration control of said common bus.

24. A packaged semiconductor chip according to claim 21 wherein if said arbitration configuration logic unit receives an inactive arbitration configuration signal via said primary input and an inactive arbitration configuration signal via said secondary input, said arbitration configuration logic decodes the received signals to determine that none of said bus master components are coupled to said arbitration control bus and to determine not to enable said arbitration control logic unit to provide single point arbitration control of said common bus.

25. The apparatus according to claim 21 wherein said arbitration configuration logic unit implements the state table:

| Primary Input | Secondary Input | Bus Master Status |
| --- | --- | --- |
| inactive | inactive | no bus master components on arbitration control bus; no arbitration of common bus required. |
| inactive | active | bus master components on arbitration control bus; arbitration control logic unit not enabled |
| active | don't care | bus master components on arbitration control bus; arbitration control logic unit enabled | to decode said arbitration configuration signals received on said primary and secondary inputs.

26. In a packaged semiconductor chip, a method for configuring the arbitration of a common bus, said common bus capable of being controlled by a bus master component coupled to the common bus and to an arbitration control bus, and wherein said packaged semiconductor chip includes a bus master logic unit coupled to said common bus for controlling said common bus, an arbitration control logic unit coupled to said bus master logic unit and coupled to said arbitration control bus for transmitting and receiving arbitration control signals, and an arbitration configuration logic unit coupled to said arbitration control logic unit and to said arbitration control bus, said method comprising the steps of;
  receiving arbitration configuration signals from said arbitration control bus at said arbitration configuration logic unit;
  decoding said received arbitration configuration signals at said arbitration configuration logic unit;
  determining via said decoded arbitration configuration logic signals whether to enable said arbitration control logic unit to provide single point arbitration control of said common bus;
  wherein said arbitration configuration logic unit is arranged so as not to require separate dedicated input lines on the packaged semiconductor chip.

27. A method according to claim 26 wherein said decoding of said arbitration configuration signals permits the determination of whether at least one of said bus master components are coupled to said arbitration control bus.

28. A method according to claim 27 further including the step of determining whether said packaged semiconductor chip is to operate in a configuration mode or in an arbitration mode.

29. A method according to claim 28 wherein said arbitration control logic unit receives said determination of whether said packaged semiconductor chip is to operate in said configuration mode or in said arbitration mode.

30. A method according to claim 28 wherein said arbitration configuration logic unit receives said determination of whether said packaged semiconductor chip is to operate in said configuration mode or in said arbitration mode.

31. A method according to claim 29 wherein if said arbitration control logic unit receives said determination that said packaged semiconductor chip is to operate in said configuration mode, said arbitration control logic unit transmits active arbitration configuration signals onto said arbitration control bus.

32. A method according to claim 29 wherein if said arbitration control logic unit receives said determination that said packaged semiconductor chip is to operate in said arbitration mode and if said arbitration configuration logic unit determines that at least one of said bus master components are coupled to said arbitration control bus, said arbitration control logic unit transmits and receives arbitration control signals over said arbitration control bus.

33. A method according to claim 29 wherein if said arbitration control logic unit receives said determination that said packaged semiconductor chip is to operate in said arbitration mode and if said arbitration configuration logic unit determines that none of said bus master components are coupled to said arbitration control bus, said arbitration control logic unit does not transmit and receive said arbitration control signals over said arbitration control bus.

34. A method according to claim 29 wherein if said arbitration control logic unit receives said determination that said packaged semiconductor chip is to operate in said arbitration mode and if said arbitration configuration logic unit determines that none of said bus master components are coupled to said arbitration control bus, said bus master logic unit may control said common bus without participating in arbitration of the common bus.

35. A method according to claim 29 wherein said arbitration control logic unit is coupled to said arbitration control bus via arbitration control bus request inputs and arbitration control bus grant outputs, said arbitration control bus request inputs and arbitration control bus grant outputs affixed to said packaged semiconductor component and capable of forming a conductive path from said arbitration control bus to said arbitration control logic unit.

36. A method according to claim 30 wherein if said arbitration configuration logic unit receives said determination that said packaged semiconductor chip is to operate in said configuration mode, said arbitration configuration logic unit decodes said arbitration configuration signals received from said arbitration control bus to determine whether at least one of said bus master components are coupled to said arbitration control bus, and to determine whether to enable said arbitration control logic unit to perform single point arbitration control of said common bus.

37. A method according to claim 32 wherein if said arbitration control logic unit receives said determination that said packaged semiconductor chip is to operate in said arbitration mode and if said arbitration configuration logic unit determines that at least one of said bus master components are coupled to said arbitration control bus, said bus master logic unit may control said common bus by participating in arbitration of said common bus.

38. A method according to claim 35 wherein said arbitration configuration logic unit is coupled to said arbitration control bus by a plurality of said arbitration control bus request inputs, said arbitration configuration logic unit sharing said plurality of arbitration control bus request inputs with said arbitration control logic unit.

39. A method according to claim 37 wherein if said arbitration configuration logic unit further determines that said arbitration control logic unit is to be enabled to provide single point arbitration control of said common bus, said arbitration control logic unit receives request signals from said bus master logic unit on said packaged semiconductor chip and from said at least one bus master components coupled to said arbitration control bus, and transmits grant response signals to said bus master logic unit on said packaged semiconductor chip and to said at least one bus master components coupled to said arbitration control bus.

40. A method according to claim 37 wherein if said arbitration configuration logic unit further determines that said arbitration control logic unit should not be enabled to provide single point arbitration control of said common bus, said arbitration control logic unit receives grant responses from at least one of said at least one bus master components coupled to said arbitration control bus, and transmits request signals to said at least one of said at least one bus master components coupled to said arbitration control bus.

41. A method according to claim 38 wherein a first input of said plurality of shared arbitration control bus request inputs is a primary input and a second input of said plurality of shared arbitration control bus request inputs is a secondary input, said arbitration configuration signals being received by said arbitration configuration logic unit via said primary and secondary inputs.

42. A method according to claim 39 wherein if said bus master logic unit seeks to control said common bus, said bus master logic unit sends request signals to said arbitration control logic unit, and wherein prior to assuming control of said common bus, said bus master logic unit must receive said grant response from said arbitration control logic unit.

43. A method according to claim 40 wherein if said bus master logic unit seeks to control said common bus, said bus master logic unit transmits a request signal to said arbitration control logic unit for transmission over said arbitration control bus, and wherein prior to assuming control of said common bus, said bus master logic unit must receive said grant response from said arbitration control bus via said arbitration control logic unit.

44. A method according to claim 41 wherein said primary and secondary inputs are configured to register an inactive state if they are not coupled to said arbitration control bus.

45. A method according to claim 41 wherein said arbitration configuration logic unit receives said determination of whether said packaged semiconductor chip is to operate in said arbitration mode or in said configuration mode.

46. A method according to claim 45 wherein if said arbitration configuration logic unit receives said determination that said packaged semiconductor chip is to operate in said configuration mode, said arbitration configuration logic unit decodes said arbitration configuration signals received at said primary and secondary inputs to determine whether at least one of said bus master components are coupled to said arbitration control bus, and to determine whether to enable said arbitration control logic unit to provide single point arbitration of said common bus.

47. A method according to claim 46 wherein if said arbitration configuration logic unit receives an active arbitration configuration signal via said primary input, said arbitration configuration logic unit decodes the active arbitration configuration signal to determine that at least one of said bus master components are coupled to said arbitration control bus and to enable said arbitration control logic unit to provide single point arbitration of said common bus.

48. A method according to claim 46 wherein if said arbitration configuration logic receives an inactive arbitration configuration signal via said primary input and an active arbitration configuration signal via said secondary input, said arbitration configuration logic unit decodes the received signals to determine that at least one of said bus master components are coupled to said arbitration control bus and to determine not to enable said arbitration control logic unit to provide single point arbitration of said common bus.

49. A method according to claim 46 wherein if said arbitration configuration logic unit receives an inactive arbitration configuration signal via said primary input and an inactive arbitration configuration signal via said secondary input, said arbitration configuration logic unit decodes the received signals to determine that none of said bus master components are coupled to said arbitration control bus and to determine not to enable said arbitration control logic unit to provide single point arbitration of said common bus.

50. The method according to claim 46 wherein said arbitration configuration logic unit implements the state table:

| Primary Input | Secondary Input | Bus Master Status |
|---|---|---|
| inactive | inactive | no bus master components on arbitration control bus; no arbitration of common bus required. |
| inactive | active | bus master components on arbitration control bus; arbitration control logic unit not enabled |
| active | don't care | bus master components on arbitration control bus; arbitration control logic unit enabled | to decode said arbitration configuration signals received on said primary and secondary inputs.

* * * * *